United States Patent
Knauseder et al.

[11] 3,716,579
[45] Feb. 13, 1973

[54] ESTER DERIVATIVES OF PLEUROMUTILIN

[75] Inventors: Franz Knauseder, Ernst Brandl, both of Tirol, Austria

[73] Assignee: Biochemie Gesellschaft m.b.H., Vienna, Austria

[22] Filed: July 20, 1970

[21] Appl. No.: 56,752

[30] Foreign Application Priority Data

July 21, 1969   Austria..............................A 7004/69

[52] U.S. Cl.................260/488 B, 99/2 G, 99/2 AB, 99/4, 195/49, 260/410, 260/484 R, 260/586 A, 424/299
[51] Int. Cl...........................C07c 69/16, C12d 9/22
[58] Field of Search..........................260/488 B, 410

[56] References Cited

OTHER PUBLICATIONS

Chem. Abstracts, 58: 7981d–7982h

*Primary Examiner*—Vivian Garner
*Attorney*—Gerald D. Sharkin, Robert S. Honor, Frederick H. Weinfeldt, Richard E. Vila, Walter F. Jewell, Alvin Browdy and Browdy and Neimark

[57] ABSTRACT

The invention concerns new pleuromutilin derivatives of the formula:

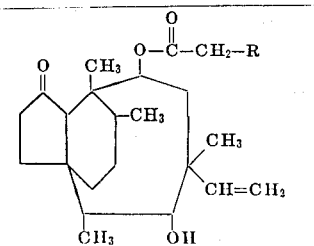

wherein R is $CH_3-(CH_2)_7-CH=CH-(CH_2)_7-COO-$, $CH_3-(CH_2)_4-CH=CH-CH_2-CH=CH-(CH_2)_7-COO-$, $CH_3-(CH_2)_9-CH=CH-(CH_2)_7-COO-$, or hydrogen.

The derivatives are useful animal feed additives, and also find application in veterinary medicine.

2 Claims, No Drawings

ESTER DERIVATIVES OF PLEUROMUTILIN

The invention relates to new pleuromutilin derivatives of formula I,

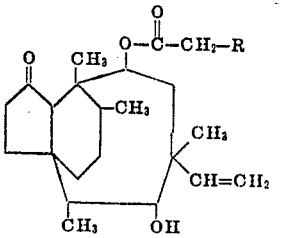

wherein R is
$CH_3-(CH_2)_7-CH=CH-(CH_2)_7-COO-$,
$CH_3-(CH_2)_4-CH=CH-CH_2-CH=CH-(CH_2)_7-COO-$,
$CH_3-(CH_2)_9-CH=CH-(CH_2)_7-COO-$,
or hydrogen,
as well as processes for the production thereof.

a. In accordance with the invention, there is provided a process for the production of pleuromutilin derivatives of formula I, which comprises cultivating the strain NRRL 3100 of the species Clitopilus passeckerianus (Pil.) Sing., the variant NRRL 3279 of said strain NRRL 3100, the strain NRRL 3473 of the species Clitopilus prunulus (Scop. ex Fr.) Kummer, the strain NRRL 3474 of the species Clitopilus pinsitus (Fr.) ss. Romagn. Joss., or a mutant or variant of any one of said strains or variants, in an aqueous nutrient medium containing assimilable sources of nitrogen and carbon, and isolating the resulting compounds of formula I.

b. Further, in accordance with the invention, there is provided a process for the production of 14-desoxy-14 -acetoxymutilin of formula Ia,

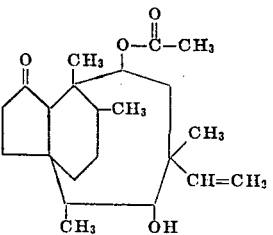

which comprises enzymatically acetylating mutilin of formula II

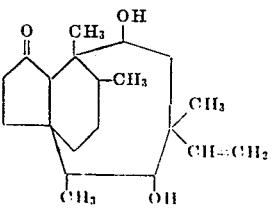

with the strain NRRL 3100 of the species Clitopilus passeckerianus (Pil.) Sing., the variant NRRL 3279 of said strain NRRL 3100, the strain NRRL 3473 of the species Clitopilus prunulus (Scop. ex Fr.) Kummer, the strain NRRL 3474 of the species Clitopilus pinsitus (Fr.) ss. Romagn. Joss., or a mutant or variant of any one of said strains or variants, or with an enzyme extract or dry mycelia containing said strains or mutants or variants thereof, in an aqueous medium containing assimilable sources of nitrogen and carbon, and isolating the resulting compound of formula Ia.

The microorganisms used in accordance with the invention belong to the family of Tricholomataceae, order of Agaricales, and class of Basidiomycetes. Cultures of these organisms have been deposited with the Fermentation Division of the Northern Regional Research Laboratories (NRRL), Peoria, Illinois, and were allocated the NRRL numbers indicated above.

The fermentation described in embodiment (a) of the process is conveniently effected in accordance with the submerged culture technique, although it is also possible to use the surface culture technique. Sugars, especially glucose, lactose or starch, may be used as carbon sources, and inorganic or organic nitrogen compounds such as sodium nitrate, ammonium sulphate, autolyzed yeast or cornsteep liquor may be used as nitrogen sources. In their impure forms they simultaneously cover the usual mineral substance requirement. The fermentation process is comparable with a penicillin fermentation in regard to change of pH, oxygen absorption, metabolism of nutritive material and formation of the desired products. Fermentation temperatures between 25° and 28°C lead to good growth and high yields. The formation of the pleuromutilin derivatives of the invention is stimulated by the addition of maize oil, sun flower oil, olive oil, sperm oil and other oils of animal and vegetable origin, using amounts between 0.05 and 5 percent. The duration of fermentation is explicitly dependent on the conditions used. Normally it lasts 3 to 5 days, but this period may also be shorter or longer. The desired products are partially deposited in the surrounding medium and are partially accumulated in the cells. Their isolation may therefore by effected from both the culture filtrate and the mycelium.

One preferred method of effecting the fermentation described in embodiment a) of the process consists in that the microorganism of the species Clitopilus passeckerianus (Pil.) Sing. (NRRL 3100) is first cultivated in a preculture medium containing malt extract, bean flour, yeast extract, agar and peptone as carbon and nitrogen sources, as well as mineral salts, and the resulting fermentation mash is subsequently added to a fermentation solution containing glucose as carbohydrate source, and autolyzed beer yeast as nitrogen source, as well as mineral salts, for further cultivation. The resulting fermentation mash is optionally again added to a fermentation solution of the last-named type for further cultivation. After cultivation is completed the resulting pleuromutilin derivatives are isolated in known manner. A separation of the substance mixture into a pleuromutilin fatty acid ester mixture and 14-desoxy-14-acetoxymutilin may optionally be effected.

A further method of effecting the above embodiment (a) of the process consists in that a preculture cultivated as indicated above is added to a fermentation solution containing glucose as carbon source, and autolyzed compressed yeast as nitrogen source, as well as mineral salts. The resulting mycelium mash is again transferred to a fermentation solution of the type indicated above. After this cultivation is completed the resulting fermentation mash is finally added to a further fermentation solution containing glucose as carbon source, and soybean nitrogen as nitrogen source, as well as mineral salts. After this last cultivation is completed, the resulting substance mixture is isolated in known manner, whereby working up may be effected in a manner analogous to the first-named process.

The mycelium of the microorganisms obtained by the submerged or surface culture technique may be used as enzyme carrier for the enzymatic acetylation of mutilin to 14-desoxy-14-acetoxymutilin in accordance with embodiment (b) of the process. However, it is also possible to use dry mycelium or enzyme extracts of the fungi described above. The conversion rate is dependent on the provided aeration. The substrate concentration for large conversion rates ranges, for example, between 0.5 and 5.0 g of mutilin for every liter of culture solution. Acetylation is advantageously effected in a buffered medium at pH values between 4.5 and 8.0 with the addition of a carbon source and good aeration. Sugars such as glucose or lactose may be used as carbon source. Maize oil, sperm oil, sun flower oil, oleic acid methyl ester, palmitic acid, glycerin, ethanol or amino acids may, however, likewise be used. Suitable concentrations for acetylation range, for example, between 0.5 and 5 percent. Acetylation is stimulated by the addition of Cu ions in small concentration, preferably 10 ppm.

One preferred method of effecting the above enzymatic acetylation of mutilin to 14-desoxy-14-acetoxymutilin consists in that the preculture of the microorganism NRRL 3100 of *Clitopilus passeckerianus*, obtained in accordance with embodiment a) of the process, is added to a fermentation solution containing glucose as carbon source and autolyzed compressed yeast as nitrogen source, as well as mineral salts. The resulting mycelium mash is cultivated in a fermentation solution containing cornsteep liquor and sperm oil inter alia, and the resulting culture is finally suspended in a replacement medium which has been buffered with phosphate and contains maize oil as carbon source. The substrate concentration in this case amounts to 3 g of mutilin for every liter of culture. Working up of the material to the desired 14-desoxy-14-acetoxymutilin, which is obtained with a high yield after aerating for 48 hours, may be effected in known manner.

The structure of the pleuromutilin fatty acid esters produced in accordance with the invention, is determined by the UV and IR spectra, degradation reactions, paper, thin layer and gas chromatography. Thin layer chromatography of the fatty acid methyl esters obtained by exchange of ester radicals in pleuromutilin fatty acid esters, indicates the presence of oleic acid, linolic acid and gadoleic acid on silica gel plates impregnated with silver nitrate, on which a separation of the different isomers is possible. The structure of 14-desoxy-14-acetoxymutilin is determined by the IR spectra, degradation reactions and synthesis of pleuromutilin.

The pleuromutilin derivatives of the invention are useful antibiotics and may be employed as animal feed supplements for increasing meat production. Owing to the small dose which needs to be employed in a ready-mixed feed and also non-excessive resorption of the derivatives by the animal, the consumption of meat from animals treated with the pleuromutilin derivatives does not involve danger of a resistance to antibiotic treatment developing in the consumer. Furthermore, the pleuromutilin derivatives of the invention are not employed in human therapy.

A suitable amount of pleuromutilin derivative of formula I in poultry feed ranges from between 2.5 and 90 mg of ready-mixed feed. A suitable amount for pig feed ranges between 10 and 180 mg per kg of ready-mixed feed. For calves and fattening cattle the pleuromutilin derivatives of formula I should be made available such that between about 25 and 120 mg of active agent are taken up daily by each animal.

Furthermore, the pleuromutilin derivatives of the invention are useful in veterinary medicine as indicated by their effect on pathogenic germs in animals. More particularly, the derivatives are active against staphylococci, and streptococci. In use, the derivatives may be provided in the form of a solution or paste and applied topically to the udder of a cow. The concentration of the derivatives in the solution or paste may conveniently be between 0.0001 and 5 mg/ml.

The derivatives are furthermore useful in treating illnesses in animals produced by PPLO, and the required amounts may be applied in the animal feed or drinking water. The feed should contain between 10 and 100 p.p.m. of the pleuromutilin derivative in treating such illnesses.

EXAMPLE 1: Fermentation

Two cultures of Clitopilus passeckerianus (NRRL 3100) on an agar nutrient medium are rinsed with a sterile physiological common salt solution, whereupon 3 cc amounts of the resulting suspension are used for inoculation of 60 cc amounts of sterile fermentation nutrient solution in two 500 cc Erlenmeyer wide neck flasks.

| Nutrient medium for slant agar: | |
|---|---|
| Bean flour | 10.0 g |
| $KH_2PO_4$ | 0.5 g |
| $FeCl_3$ (1% solution) | 1.0 cc |
| Yeast extract | 0.1 g |
| Malt extract | 50.0 g |
| Peptone | 1.0 g |
| Agar | 15.0 g |
| Make up to 1000 cc with distilled water; natural pH. | |

| Nutrient solution for fermentation: | |
|---|---|
| Glucose | 50.0 g/l |
| Autolyzed beer yeast nitrogen | 1.0 g/l |
| $KH_2PO_4$ | 1.0 g/l |
| $MgSO_4 \cdot 7 H_2O$ | 0.5 g/l |
| $Ca(NO_3)_2$ | 0.5 g/l |
| NaCl | 0.1 g/l |
| $FeSO_4 \cdot 7 H_2O$ | 0.05 g/l |
| Make up to 1000 cc with distilled water; pH before sterilization: 6.0. | |

After fermentation at 25°C for 120 hours on a rotating shaking machine with a stroke of 40 mm and 250 revolutions per minute, the content in the two 500 cc Erlenmeyer wide neck flasks turns into a thick mash. 10 cc amounts of this mash are used for inoculation of ten 2 liter Erlenmeyer wide neck flasks, which are filled with 200 cc amounts of the above sterile fermentation nutrient solution. Incubation is effected under conditions analogous to those of the preliminary stage. After 72 hours the fermentation mash in the ten 2 liter Erlenmeyer flasks (each flask contains 200 cc) is used for inoculation of a fermentation vessel filled with 40 liters of the above sterile fermentation nutrient solution, this fermentation vessel being provided with the devices for a submerged culture fermentation in accordance with the baffled system. Fermentation is effected at 25°C for 120 hours while stirring and aerating, whereupon the thick pappy content is transferred to a larger fermentation vessel containing 140 liters of the same sterile nutrient solution. Sperm oil is preferably used as antifoaming agent. After stirring and aerating for 72 hours at a counterpressure of 1.8 atmospheres, fermentation is stopped. The crop is pressed off over a pressure suction filter and the mycelium cake is dried in a hurdle drier at about 40°C. In this manner 3.8 kg of dry mycelium are obtained, from which the desired substances may be isolated later.

EXAMPLE 2: Fermentation

The mycelium of a culture of Clitopilus passeckerianus (NRRL 3100) on broken maize is rinsed with a sterile physiological common salt solution. 5 cc amounts of the resulting suspension are used for inoculation of four 500 cc Erlenmeyer wide neck flasks containing 50 cc amounts of the following sterile fermentation nutrient solution:

| | |
|---|---|
| Autolyzed compressed yeast nitrogen | 1.5 g/l |
| Glucose | 30.0 g/l |
| Dextrin | 10.0 g/l |
| $KH_2PO_4$ | 4.0 g/l |
| $(NH_4)_2SO_4$ | 5.0 g/l |
| Make up to 1000 cc with distilled water; pH before sterilization: 6.0. | |

The flasks are shaken at 25°C for 100 hours on a shaking machine with longitudinal motion, with a range of 10 cm and 90 movements per minute, whereupon the content is used for inoculation of six 2 liter Erlenmeyer flasks containing 400 cc amounts of the same sterile fermentation nutrient solution. After shaking for 36 hours under the conditions indicated above, the resulting mycelium mash is transferred into a 100 liter submerged culture vessel, containing 50 liters of the following sterile fermentation nutrient solution:

| | |
|---|---|
| Soybean nitrogen | 2.0 g/l |
| Cane sugar | 20.0 g/l |
| Glucose | 20.0 g/l |
| Make up to 1000 cc with distilled water; pH before sterilization: 6.5. | |
| $CaCO_3$ (sterilized separately) | 5.0 g/l |

After fermentation for 120 hours, the content of this vessel is used for inoculation of a submerged culture tank, containing 1,000 liters of the last-named fermentation nutrient solution. It is aerated for 96 hours and stirred (0.5 liters of air per liter of nutrient solution per minute; 210 revolutions per minute). Sperm oil is preferably used as antifoaming agent. After an initial drop of the pH value to 5.5, this rises to 6.8 after 48 hours, has a value of 6.5 after 72 hours, and towards the end of fermentation reaches a value of 7.0. The weight of the mycelium after 48 hours amounts to 18 g/l. The mycelium is filtered off over a circular revolving suction filter and is dried in a hurdle drier at about 40°C. In this manner 19.3 kg of dried mycelium are obtained, which contains the main portion of the desired biologically active compounds.

EXAMPLE 3: Enzymatic acetylation of mutilin to 14-desoxy-14-acetoxymutilin 120 cc of the fermentation nutrient solution indicated in Example 2 in a 500 cc Erlenmeyer flask are inoculated with a culture of Clitopilus passeckerianus (NRRL 3100) on broken maize, and shaking is effected for 72 hours at 24°C while aerating well. This inoculated material is placed in twenty 500 cc Erlenmeyer flasks, filled with 50 cc amounts of the following nutrient solution:

| | |
|---|---|
| Nitrogen as cornsteep solids | 1.2 g/l |
| Glucose | 50.0 g/l |
| $MgSO_4 \cdot 7 H_2O$ | 2.0 g/l |
| Make up to 1000 cc with distilled water; pH before sterilization: 6.0. | |

The main stage culture produced on this nutrient solution at 24°C and with good aeration for 72 hours, is sucked off over a glass suction filter in sterile condition, and the mycelium of each flask is suspended in 50 cc amounts of replacement medium consisting of a phosphate buffer having a pH value of 6.5 (0.066 molar) and a carbon source. Maize oil at a concentration of 2 percent is used as carbon source. Mutilin is added to the culture medium so that the concentration amounts to 3 g of mutilin per liter of culture medium. After aerating the material at 24°C for 48 hours, 95 percent of the mutilin employed is converted into - acetoxymutilin. -desoxy-14-acetpxymutilin.

EXAMPLE 4: Isolation of 14-desoxy-14-acetoxymutilin, formed by enzymatic acetylation of mutilin by the replacement process The content of five flasks (about 230 cc) which contains 95 percent of acetylated mutilin (in accordance with Example 2), is homogenized and extracted thrice with 115 cc amounts of ethyl acetate. The combined extracts which have been dehydrated are treated with 0.5 percent by weight of active charcoal, are concentrated in a vacuum to about 5 cc, 15 cc of diisopropyl ether are added, and the mixture is placed in a refrigerator. 14-Desoxy-14-acetoxymutilin is obtained shortly thereafter in crystalline form. It is subsequently recrystallized twice. The yield amounts to 401 mg of crystalline product having a M.P. of 183°C (uncorrected).

EXAMPLE 5: Isolation of the unsaturated pleuromutilin fatty acid esters and of 14-desoxy-14-acetoxymutilin 1 kg of dry mycelium, produced in accordance with Example 1 or 2, is extracted 5 times with 5 liter amounts of 60 percent methanol, whereupon the methanol extract is defatted twice with 2.5 liter amounts of petroleum ether. After dehydrating and concentrating the petroleum ether phase to a great extent, the viscous residue is divided over 10 stages between 95 percent methanol and petroleum ether (relationship 1:1). The 3rd to 8th stage contain the pleuromutilin fatty acid esters, the 9th and 10th stage 14-desoxy-14-acetoxymutilin. The 3rd to 8th stage are combined, dehydrated, concentrated as far as possible, a 10-fold quantity of hexane is added, cooling is effected and the precipitated material is filtered off.

After concentrating once more, a yellow viscous oil is obtained. This is taken up in diisopropyl ether and treated with 10 percent by weight of active charcoal, whereby a thin layer chromatographically pure mixture of the different fatty acid esters of pleuromutilin is obtained. The yield amounts to 5.3 g.

In order to ascertain the exact percentage composition, 1 g of the substance mixture is dissolved in 20 cc of petroleum ether, this is covered with a layer of 10 cc of a caustic potash solution in methanol, and the material is kept at −5°C for 1 hour while shaking continuously and in the absence of light. The petroleum ether phase is washed with 1 percent hydrochloric acid and with water and is dried, whereupon the methyl ester of each of the fatty acids is obtained. Part of the methyl esters is subjected to gas chromatographical analysis, whereby the following composition results:

40 to 45 percent of oleic acid methyl ester,
45 to 50 percent of linolic acid methyl ester,
about 5 percent of gadoleic acid methyl ester.

200 mg of the mixture of esters are hydrogenated in 20 cc of ethyl acetate with 2.0 g of palladium charcoal. The taking up of hydrogen stops after 30 minutes. An infrared exposure of the hydrogenated esters shows that the compounds are thoroughly hydrogenated. The esters are subsequently split, and the resulting acids are examined by paper chromatography. The mixture consists of over 90 percent of a $C_{18}$ acid, the remainder of a $C_{20}$ acid.

The pleuromutilin resulting from the exchange of ester radicals in the fatty acid esters is isolated from the methanol phase and is compared with a material obtained by fermentation in regard to melting point, infrared and ultraviolet spectra. The compounds are identical. An alkaline saponification also yields mutilin in each case.

The 9th and 10th stage of the distribution, containing 14-desoxy-14-acetoxymutilin, are dehydrated and strongly concentrated in a vacuum. Further purification is effected by chromatography on a silica gel column. The relationship between the material subjected to chromatography and the adsorbent amounts to 1 : 100 . Elution is effected with chloroform, and after concentrating the active fractions and adding diisopropyl ether, the desired compound is obtained in crystalline form. It is recrystallized twice from diisopropyl ether and dried. Yield: 1.23 g with a M.P. of 183°C (uncorrected).

What is claimed is:

1. A pleuromutilin derivative of the formula:

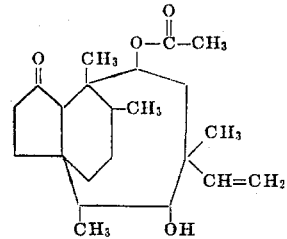

wherein R is $CH_3—(CH_2)_7—CH=CH-(CH_2)_7—COO—$, $CH_3—(CH_2)_4—CH=CH—CH_2—CH=CH—(CH_2)_7—COO—$, $CH_3—(CH_2)_9—CH=CH—(CH_2)_7—COO—$, or hydrogen.

2. 14-Desoxy-14-acetoxymutilin of the formula:

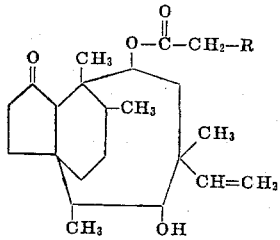

* * * * *